United States Patent [19]

Tsunashima

[11] 4,163,603
[45] Aug. 7, 1979

[54] WIDE-ANGLE PHOTOGRAHIC OBJECTIVE
[75] Inventor: Teruyoshi Tsunashima, Kawasaki, Japan
[73] Assignee: Nippon Kogaku K.K., Tokyo, Japan
[21] Appl. No.: 826,144
[22] Filed: Aug. 19, 1977
[30] Foreign Application Priority Data
Aug. 20, 1976 [JP] Japan ................... 51-98765
[51] Int. Cl.² .............................. G02B 9/64
[52] U.S. Cl. ....................... 350/214; 350/176
[58] Field of Search ................... 350/214, 176
[56] References Cited
U.S. PATENT DOCUMENTS
3,877,795  4/1975  Yamashita .................... 350/214

Primary Examiner—Paul A. Sacher
Attorney, Agent, or Firm—Shapiro and Shapiro

[57] ABSTRACT

A wide-angle photographic objective comprises ten (10) components. In the order from the object side, the first component is a positive meniscus lens having its convex surface facing the object side, the second component is a negative meniscus lens having its convex surface facing the object side, the third component is a negative meniscus lens having its convex surface facing the object side, the fourth component is a positive lens, the fifth component is a negative meniscus lens having its convex surface facing the object side, the sixth component is a positive lens, the seventh component is a positive lens, the eighth component is a biconcave negative lens comprising a doublet, the ninth component is a positive meniscus lens having its convex surface facing the image side, and the tenth component is a positive lens.

4 Claims, 5 Drawing Figures

WIDE-ANGLE PHOTOGRAHIC OBJECTIVE

BACKGROUND OF THE INVENTION

1. Field of the Invention

This invention relates to an inverted telephoto lens type wide-angle photographic objective having a relatively large aperture.

2. Description of the Prior Art

In an inverted telephoto lens type wide-angle objective for single lens reflex cameras, it is usually necessary that the back focal distance be greater than the focal length as the angle of view is increased or the focal length is decreased. This in turn leads to the necessity of increasing the refractive power of the forward diverging group. However, it is difficult to correct the resulting negative distortion, spherical aberration and especially, coma, and the greater the aperture, the more difficult it has been to keep the aberrations well corrected.

SUMMARY OF THE INVENTION

The present invention has, for its object, to provide a wide-angle photographic objective having an angle of view of 84° and a relative aperture of 1:2 and in which the aforementioned aberrations are well corrected.

The invention will become fully apparent from the following detailed description of several embodiments thereof, taken in conjunction with the accompanying drawings.

DESCRIPTION OF THE PREFERRED EMBODIMENTS

Figure 1:
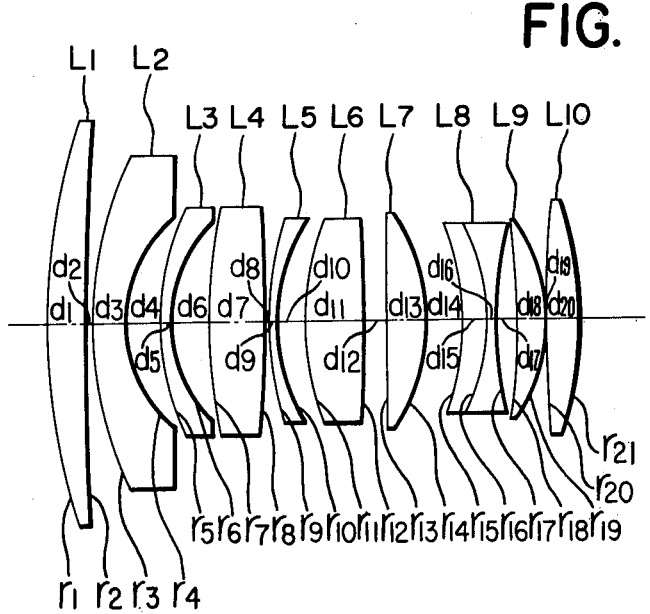
FIG. 1 shows the construction of a lens system according to the invention.
Figures 2A, 2B, 2C:
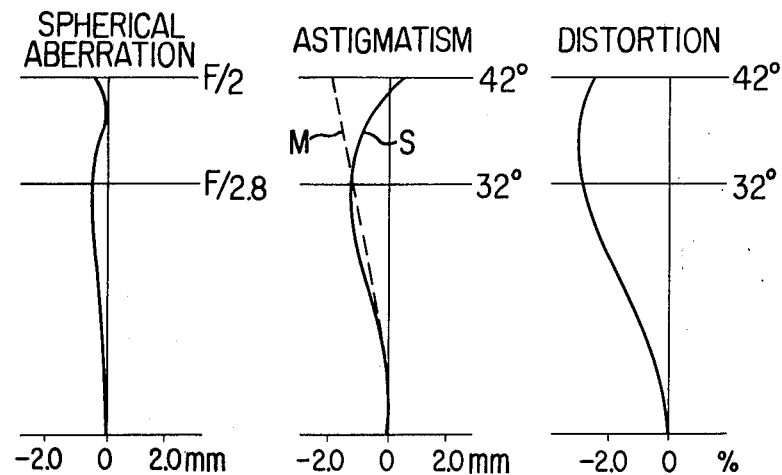
FIGS. 2A, 2B, 2C and 2D illustrate aberrations for a lens system in accordance with the third embodiment of the invention, the values of the various aberrations being for f=100 mm.
Figure 2D:
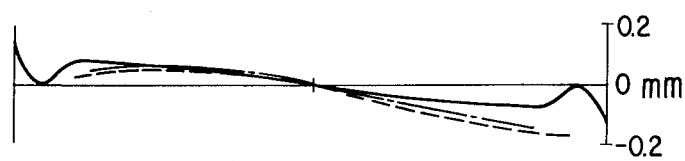

The wide-angle photographic objective according to the present invention comprises, in the order from the objective side, a first component $L_1$ which is a positive meniscus lens haing its convex surface facing the object side, a second component $L_2$ which is a negative meniscus lens having its convex surface facing the object side, a third component $L_3$ which is a negative meniscus lens having its convex surface also facing the object side, a fourth component $L_4$ which is a positive lens, a fifth component $L_5$ which is a negative meniscus lens having its convex surface facing the object side, a sixth component $L_6$ which is a positive lens, a seventh component $L_7$ which is a positive lens, an eighth component $L_8$ which is a biconcave negative lens comprising a doublet, a ninth component $L_9$ which is a positive meniscus lens having its convex surface facing the image side, and a tength component $L_{10}$ which is a positive lens. This wide-angle objective achieves its intended purpose by satisfying the following conditions:

$$6.1f < f_1 < 8.0f \quad (1)$$

$$-1.4f < f_2 < -1.1f \quad (2)$$

$$-2.1f < f_3 < -1.7f \quad (3)$$

ti $2.9f < f_4 < 4.0f \quad (4)$ $$-5.0f < f_5 < -2.4f \quad (5)$$

$$1.3f < f_6 < 1.7f \quad (6)$$

$$1.6f < f_7 1.8f \quad (7)$$

$$-1.0f < f_8 < -0.8f \quad (8)$$

$$1.3f < f_9 < 1.6f \quad (9)$$

$$2.0f < f_{10} < 2.3f \quad (10)$$

where f represents the total focal length of the entire system, and $f_1, f_2, f_3, \ldots f_{10}$ represent the focal lengths of said first, second, third, ... and tenth components, respectively.

Each of the above conditions will hereinafter be discussed in detail.

Condition (1) is for keeping the balance between distortion and flatness of image plane. If the lower limit of this condition is exceeded, it will be easy to correct the negative distortion which will be created by the diverging system in the forward group. However, the back focal distance will become shorter so that the power of the diverging lens in the forward group must be increased, as a result of which coma will be created to such an extent that it will be difficult to correct it. If the upper limit is exceeded, the back focal distance will be easy to secure, whereas the negative distortion will be increased. An approach to correct this by a subsequent lens component will be to increase the air spaces and lens thicknesses in the forward group and especially, if the center thickness of the negative meniscus lens $L_1$ forming the first component is increased, it will be possible to correct distortion alone without so much affecting the other aberrations to any substantial degree. However, this is not desirable because the diameter of the forward lens has to be increased.

Conditions (2) and (3) are intended to secure a predetermined back focal distance. If the lower limits of these conditions are exceeded, the back focal distance will become ample, but the negative distortion will become so excessive that it will be difficult to correct it even by any other lens component. If the upper limit of these conditions are exceeded, it will be difficult to secure a predetermined back focal distance. Further, if the lower limit of condition (3) is exceeded, spherical aberration will be over-corrected and if the upper limit of condition (3) is exceeded, spherical aberration will be under-corrected.

Condition (4) is necessary to maintain good symmetry of meridional coma. If the lower limit of this condition is exceeded, meridional coma will be asymmetric in the positive direction, and if the upper limit of this condition is exceeded, meridional coma will be asymmetric in the negative direction. If the correction of the asymmetry of meridional coma created outside the range of this condition is undertaken by any other lens component, bending of high-order spherical aberration will undesirably be caused.

Condition (5) is necessary for the correction of spherical aberration. If the lower limit of this condition is exceeded, spherical aberration will become excessive toward the negative and in this case, the spherical aberration may be drawn toward the positive by decreasing the air space immediately behind the fifth lens component $L_5$. However, high-order spherical aberrations will be created to an extent too great to be corrected by the other lens components, and thus a sufficiently corrected condition would not be maintained. If the upper limit of condition (5) is exceeded, spherical aberration will become excessive toward the positive, and the spherical aberration may be drawn toward the negative by increasing the air space immediately behind the fifth lens component L$_5$, but again it will become difficult to eliminate high-order spherical aberrations.

Conditions (6) and (7) are desirable for correcting spherical aberration and meridional coma. If the lower limits of these two conditions are exceeded, there will be a strong tendency that spherical aberration becomes excessive toward the negative, while meridional coma becomes asymmetric. If the upper limits of these conditions are exceeded, the exact converse will be the case. Thus, difficulties will be encountered in achieving sufficient correction of aberrations.

Condition (8) is intended to suitably maintain spherical aberration and astigmatism. If the lower limit of this condition is exceeded, spherical aberration will be over-corrected in the positive direction and astigmatism will also be excessive in the positive direction. If the upper limit of this condition is exceeded, the opposite tendency will become so unusually excessive that it cannot be corrected by any other lens component.

Conditions (9) and (10) are requisite for the positive lens components L$_9$ and L$_{10}$ forming the last part of the lens system, and these conditions are desirable for well maintaining spherical aberration and flatness of image plane.

Numerical data for several embodiments of the present invention will be shown below, with the understanding that r represents the curvature radius of each lens surface, d the axial thickness of each lens component or the air space between adjacent lens components, n the refractive index of each lens component, $\nu$ the Abbe number of each lens component, and the suffix i in order from the object side.

In the preferred form of the invention, the wide-angle photographic objective best achieves its intended purposes by also satisfying the following conditions:

$$1.3 < \frac{r_2 + r_1}{r_2 - r_1} < 1.8 \quad (11)$$

$$-2.2 < \frac{r_4 + r_3}{r_4 - r_3} < -1.8 \quad (12)$$

$$-3.2 < \frac{r_6 + r_5}{r_6 - r_5} < -2.8 \quad (13)$$

$$4.5 < \frac{r_{11} + r_{10}}{r_{11} - r_{10}} < 9.5 \quad (14)$$

where r$_1$, r$_2$; r$_3$, r$_4$; r$_5$, r$_6$ represent the curvature radii of the surfaces of said first, second and third components, respectively, which face the object side and the image side, respectively, r$_{10}$ represents the curvature radius of the surface of said fifth component which faces the image side, and r$_{11}$ represents the curvature radius of the surface of said sixth component which faces the object side.

Condition (11) is chiefly for correcting distortion and meridional plane. If the lower limit of this condition is exceeded, distortion will be excessive toward the positive while meridional plane will be excessive toward the negative. If the upper limit of this condition is exceeded, distortion and meridional plane will be excessive toward the opposite direction.

Condition (12) is concerned chiefly with distortion and meridional coma. If the lower limit of this condition is exceeded, distortion will be excessive toward the positive while meridional coma will be asymmetric, and if the upper limit of this condition is exceeded, distortion will be excessive toward the negative while meridional coma will be undesirably asymmetric toward the opposite direction.

Condition (13) is the condition especially concerned with spherical aberration and meridional coma. If the lower limit of this condition is exceeded, spherical aberration will be over-corrected toward the positive while meridional coma will be asymmetric. If the upper limit of this condition is exceeded, spherical aberration will be over-corrected toward the negative while meridional coma will be exceedingly asymmetric toward the opposite direction. In any case, sufficient correction of aberration would become difficult.

If the lower limit of condition (14) were to be exceeded, it would be difficult to provide suitable symmetry of meridional coma.

The biconvex negative component L$_8$ is a doublet comprising a positive lens and a negative lens cemented together and the cemented surface thereof should desirably be convex with respect to the image side, and this would particularly be suitable for the correction of chromatic difference of magnification.

By satisfying the above-described construction and conditions, it has become possible a wide-angle photographic objective having an angle of view as wide as 84° and yet having a relative aperture 1:2 and which is compact in size and moreover, to maintain a well-balanced coma over the entire image field.

| Embodiment I: | | | |
|---|---|---|---|
| Total focal length f = 100 mm | | Angle of view 2$\omega$ = 84° | |
| Relative aperture 1:2.0 | | | |
| r$_1$ = 346.939 | d$_1$ = 16.61 | n$_1$ = 1.67025 | $\nu_1$ = 57.5 |
| r$_2$ = 1632.653 | d$_2$ = 0.78 | | |
| r$_3$ = 193.878 | d$_3$ = 15.84 | n$_2$ = 1.77279 | $\nu_2$ = 49.4 |
| r$_4$ = 60.943 | d$_4$ = 13.27 | | |
| r$_5$ = 120.408 | d$_5$ = 5.14 | n$_3$ = 1.69680 | $\nu_3$ = 55.6 |
| r$_6$ = 60.310 | d$_6$ = 14.65 | | |
| r$_7$ = 239.559 | d$_7$ = 27.71 | n$_4$ = 1.66755 | $\nu_4$ = 41.9 |
| r$_8$ = −2487.845 | d$_8$ = 0.41 | | |
| r$_9$ = 152.959 | d$_9$ = 4.37 | n$_5$ = 1.69680 | $\nu_5$ = 55.6 |
| r$_{10}$ = 91.073 | d$_{10}$ = 8.49 | | |
| r$_{11}$ = 121.633 | d$_{11}$ = 29.39 | n$_6$ = 1.74950 | $\nu_6$ = 35.0 |
| r$_{12}$ = −906.759 | d$_{12}$ = 10.49 | | |
| r$_{13}$ = −1791.461 | d$_{13}$ = 15.84 | n$_7$ = 1.56384 | $\nu_7$ = 60.8 |
| r$_{14}$ = −90.808 | d$_{14}$ = 18.61 | | |
| r$_{15}$ = −112.057 | d$_{15}$ = 9.51 | n$_8$ = 1.74443 | $\nu_8$ = 49.4 |
| r$_{16}$ = −91.073 | d$_{16}$ = 3.18 | n$_9$ = 1.80518 | $\nu_9$ = 25.5 |
| r$_{17}$ = 220.816 | d$_{17}$ = 5.55 | | |
| r$_{18}$ = −676.045 | d$_{18}$ = 13.47 | n$_{10}$ = 1.7443 | $\nu_{10}$ = 49.4 |
| r$_{19}$ = −87.347 | d$_{19}$ = 0.41 | | |
| r$_{20}$ = 808.163 | d$_{20}$ = 14.65 | n$_{11}$ = 1.69680 | $\nu_{11}$ = 55.6 |
| r$_{21}$ = −190.857 | | | |

| Embodiment II: | | | |
|---|---|---|---|
| Total focal length f = 100mm | | Angle of view 2$\omega$ = 84° | |
| Relative aperture 1:2.0 | | | |
| r$_1$ = 375.510 | d$_1$ = 17.14 | n$_1$ = 1.67025 | $\nu_1$ = 57.5 |
| r$_2$ = 1909.351 | d$_2$ = 0.82 | | |
| r$_3$ = 189.796 | d$_3$ = 16.33 | n$_2$ = 1.77279 | $\nu_2$ = 49.4 |
| r$_4$ = 61.633 | d$_4$ = 13.67 | | |
| r$_5$ = 125.367 | d$_5$ = 5.31 | n$_3$ = 1.69680 | $\nu_3$ = 55.6 |
| r$_6$ = 62.449 | d$_6$ = 15.10 | | |
| r$_7$ = 246.939 | d$_7$ = 28.57 | n$_4$ = 1.66755 | $\nu_4$ = 41.9 |
| r$_8$ = −2564.490 | d$_8$ = 0.41 | | |
| r$_9$ = 157.673 | d$_9$ = 4.49 | n$_5$ = 1.69680 | $\nu_5$ = 55.6 |
| r$_{10}$ = 93.878 | d$_{10}$ = 8.69 | | |
| r$_{11}$ = 124.898 | d$_{11}$ = 32.24 | n$_6$ = 1.74950 | $\nu_6$ = 35.0 |
| r$_{12}$ = −934.694 | d$_{12}$ = 10.82 | | |
| r$_{13}$ = −1846.653 | d$_{13}$ = 16.33 | n$_7$ = 1.56384 | $\nu_7$ = 60.8 |

Embodiment II:
Total focal length f = 100mm    Angle of view 2ω = 84°
Relative aperture 1:2.0

| | | | |
|---|---|---|---|
| $r_{14} = -93.016$ | $d_{14} = 19.18$ | | |
| $r_{15} = -115.510$ | $d_{15} = 9.80$ | $n_8 = 1.74443$ | $\nu_8 = 49.4$ |
| $r_{16} = -93.878$ | $d_{16} = 3.27$ | $n_9 = 1.80518$ | $\nu_9 = 25.5$ |
| $r_{17} = 226.122$ | $d_{17} = 5.71$ | | |
| $r_{18} = -696.873$ | $d_{18} = 13.88$ | $n_{10} = 1.74443$ | $\nu_{10} = 49.4$ |
| $r_{19} = -92.653$ | $d_{19} = 0.41$ | | |
| $r_{20} = 612.245$ | $d_{20} = 15.10$ | $n_{11} = 1.69680$ | $\nu_{11} = 55.6$ |
| $r_{21} = -191.984$ | | | |

Embodiment III:
Total focal length f = 100mm    Angle of view 2ω = 84°
Relative aperture 1:2.0

| | | | |
|---|---|---|---|
| $r_1 = 379.592$ | $d_1 = 17.14$ | $n_1 = 1.65844$ | $\nu_1 = 50.8$ |
| $r_2 = 2022.604$ | $d_2 = 0.82$ | | |
| $r_3 = 203.363$ | $d_3 = 17.96$ | $n_2 = 1.71300$ | $\nu_2 = 53.9$ |
| $r_4 = 60.163$ | $d_4 = 13.67$ | | |
| $r_5 = 123.061$ | $d_5 = 5.31$ | $n_3 = 1.69680$ | $\nu_3 = 55.6$ |
| $r_6 = 62.286$ | $d_6 = 15.10$ | | |
| $r_7 = 247.755$ | $d_7 = 26.94$ | $n_4 = 1.65844$ | $\nu_4 = 50.8$ |
| $r_8 = -2564.490$ | $d_8 = 0.41$ | | |
| $r_9 = 157.673$ | $d_9 = 4.49$ | $n_5 = 1.69680$ | $\nu_5 = 55.6$ |
| $r_{10} = 93.878$ | $d_{10} = 8.98$ | | |
| $r_{11} = 125.616$ | $d_{11} = 31.43$ | $n_6 = 1.74950$ | $\nu_6 = 35.0$ |
| $r_{12} = -934.694$ | $d_{12} = 10.82$ | | |
| $r_{13} = -1846.653$ | $d_{13} = 16.33$ | $n_7 = 1.56384$ | $\nu_7 = 60.8$ |
| $r_{14} = -92.653$ | $d_{14} = 19.18$ | | |
| $r_{15} = -115.510$ | $d_{15} = 9.80$ | $n_8 = 1.74443$ | $\nu_8 = 49.4$ |
| $r_{16} = -102.041$ | $d_{16} = 3.27$ | $n_9 = 1.80518$ | $\nu_9 = 25.5$ |
| $r_{17} = 225.576$ | $d_{17} = 5.71$ | | |
| $r_{18} = -696.873$ | $d_{18} = 13.88$ | $n_{10} = 1.74443$ | $\nu_{10} = 49.4$ |
| $r_{19} = -92.347$ | $d_{19} = 0.41$ | | |
| $r_{20} = 612.245$ | $d_{20} = 15.10$ | $n_{11} = 1.69680$ | $\nu_{11} = 55.6$ |
| $r_{21} = -193.061$ | | | |

Lens constructions of several embodiments have been described above and may typically be represented by the lens construction of the first embodiment which is shown in FIG. 1. To illustrate the aberrations of a photographic objective in accordance with the invention, FIGS. 2A, 2B, 2C and 2D show the various aberrations for described Embodiment III. It will be seen that the various aberrations are all well corrected in the context of a small and bright wide-angle photographic objective, particularly having good symmetry in meridional coma.

It is believed that the advantages and improved results afforded by the wide-angle photographic objective of the invention will be apparent from the foregoing detailed description of several preferred embodiments thereof. Various modifications and changes may be made without departing from the spirit and scope of the invention as sought to be defined in the following claims.

I claim:

1. A wide-angle photographic objective comprising, in the order from the object side:
   a first component which is a positive meniscus lens having its convex surface facing the object side;
   a second component which is a negative meniscus lens having its convex surface facing the object side;
   a third component which is a negative meniscus lens having its convex surface facing the object side;
   a fourth component which is a positive lens;
   a fifth component which is a negative meniscus lens having its convex surface facing the object side;
   a sixth component which is a positive lens;
   a seventh component which is a positive lens;
   an eighth component which is a biconcave negative lens comprising a doublet;
   a ninth component which is a positive meniscus lens having its convex surface facing the image side; and
   a tenth component which is a positive lens;
   the photographic objective satisfying the following conditions:

$$6.1f < f_1 < 8.0f$$
$$-1.4f < f_2 < -1.1f$$
$$-2.1f < f_3 < -1.7f$$
$$2.9f < f_4 < 4.0f$$
$$-5.0f < f_5 < -2.4f$$
$$1.3f < f_6 < 1.7f$$
$$1.6f < f_7 < 1.8f$$
$$-1.0f < f_8 < -0.8f$$
$$1.3f < f_9 < 1.6f$$
$$2.0f < f_{10} < 2.3f$$

$$1.3 < \frac{r_2 + r_1}{r_2 - r_1} < 1.8$$

$$-2.2 < \frac{r_4 + r_3}{r_4 - r_3} < -1.8$$

$$-3.2 < \frac{r_6 + r_5}{r_6 - r_5} < -2.8$$

$$4.5 < \frac{r_{11} + r_{10}}{r_{11} - r_{10}} < 9.5$$

where f represents the total focal length of the entire system, and $f_1$, $f_2$, $f_3$, ... $f_{10}$ represent the focal lengths of said first, second, third, ... and tenth components, respectively; and where $r_1$, $r_2$, $r_3$, $r_4$, $r_5$, $r_6$ represent the curvature radii of the surfaces of said first, second and third conponents, respectively, which face the object side and the image side, respectively, $r_{10}$ represents the curvature radius of the surface of the fifth component which faces the image side, and $r_{11}$ represents the curvature radius of the surface of the sixth component which faces the object side.

2. A wide-angle photographic objective as defined in claim 1, having the following numerical data:

Total focal length f = 100mm    Angle of view 2ω = 84°
Relative aperture 1:2.0

| | | | |
|---|---|---|---|
| $r_1 = 346.939$ | $d_1 = 16.61$ | $n_1 = 1.67025$ | $\nu_1 = 57.5$ |
| $r_2 = 1632.653$ | $d_2 = 0.78$ | | |
| $r_3 = 193.878$ | $d_3 = 15.84$ | $n_2 = 1.77279$ | $\nu_2 = 49.4$ |
| $r_4 = 60.943$ | $d_4 = 13.27$ | | |
| $r_5 = 120.408$ | $d_5 = 5.14$ | $n_3 = 1.69680$ | $\nu_3 = 55.6$ |
| $r_6 = 60.310$ | $d_6 = 14.65$ | | |
| $r_7 = 239.559$ | $d_7 = 27.71$ | $n_4 = 1.66755$ | $\nu_4 = 41.9$ |
| $r_8 = -2487.845$ | $d_8 = 0.41$ | | |
| $r_9 = 152.959$ | $d_9 = 4.37$ | $n_5 = 1.69680$ | $\nu_5 = 55.6$ |
| $r_{10} = 91.073$ | $d_{10} = 8.49$ | | |
| $r_{11} = 121.633$ | $d_{11} = 29.39$ | $n_6 = 1.74950$ | $\nu_6 = 35.0$ |
| $r_{12} = -906.759$ | $d_{12} = 10.49$ | | |
| $r_{13} = -1791.461$ | $d_{13} = 15.84$ | $n_7 = 1.56384$ | $\nu_7 = 60.8$ |
| $r_{14} = -90.808$ | $d_{14} = 18.61$ | | |
| $r_{15} = -112.057$ | $d_{15} = 9.51$ | $n_8 = 1.74443$ | $\nu_8 = 49.4$ |
| $r_{16} = -91.073$ | $d_{16} = 3.18$ | $n_9 = 1.80518$ | $\nu_9 = 25.5$ |
| $r_{17} = 220.816$ | $d_{17} = 5.55$ | | |
| $r_{18} = -676.045$ | $d_{18} = 13.47$ | $n_{10} = 1.7443$ | $\nu_{10} = 49.4$ |
| $r_{19} = -87.347$ | $d_{19} = 0.41$ | | |
| $r_{20} = 808.163$ | $d_{20} = 14.65$ | $n_{11} = 1.69680$ | $\nu_{11} = 55.6$ |
| $r_{21} = -190.857$ | | | | where r represents the curvature radius of each lens surface, d the center thickness of each lens component or the air space between adjacent lens components, n the refractive index of each lens component, and $v$ the Abbe number of each lens component.

3. A wide-angle photographic objective as defined in claim 1, having the following numerical data:

| Total focal length f = 100mm | | Angle of view 2ω = 84° | |
|---|---|---|---|
| Relative aperture 1:2.0 | | | |
| $r_1$ = 375.510 | $d_1$ = 17.14 | $n_1$ = 1.67025 | $v_1$ = 57.5 |
| $r_2$ = 1909.351 | $d_2$ = 0.82 | | |
| $r_3$ = 189.796 | $d_3$ = 16.33 | $n_2$ = 1.77279 | $v_2$ = 49.4 |
| $r_4$ = 61.633 | $d_4$ = 13.67 | | |
| $r_5$ = 125.367 | $d_5$ = 5.31 | $n_3$ = 1.69680 | $v_3$ = 55.6 |
| $r_6$ = 62.449 | $d_6$ = 15.10 | | |
| $r_7$ = 246.939 | $d_7$ = 28.57 | $n_4$ = 1.66755 | $v_4$ = 41.9 |
| $r_8$ = −2564.490 | $d_8$ = 0.41 | | |
| $r_9$ = 157.673 | $d_9$ = 4.49 | $n_5$ = 1.69680 | $v_5$ = 55.6 |
| $r_{10}$ = 93.878 | $d_{10}$ = 8.69 | | |
| $r_{11}$ = 124.898 | $d_{11}$ = 32.24 | $n_6$ = 1.74950 | $v_6$ = 35.0 |
| $r_{12}$ = −934.694 | $d_{12}$ = 10.82 | | |
| $r_{13}$ = −1846.653 | $d_{13}$ = 16.33 | $n_7$ = 1.56384 | $v_7$ = 60.8 |
| $r_{14}$ = −93.016 | $d_{14}$ = 19.18 | | |
| $r_{15}$ = −115.510 | $d_{15}$ = 9.80 | $n_8$ = 1.74443 | $v_8$ = 49.4 |
| $r_{16}$ = −93.878 | $d_{16}$ = 3.27 | $n_9$ = 1.80518 | $v_9$ = 25.5 |
| $r_{17}$ = 226.122 | $d_{17}$ = 5.71 | | |
| $r_{18}$ = −696.873 | $d_{18}$ = 13.88 | $n_{10}$ = 1.74443 | $v_{10}$ = 49.4 |
| $r_{19}$ = −92.653 | $d_{19}$ = 0.41 | | |
| $r_{20}$ = 612.245 | $d_{20}$ = 15.10 | $n_{11}$ = 1.69680 | $v_{11}$ = 55.6 |
| $r_{21}$ = −191.984 | | | | where r represents the curvature radius of each lens surface, d the center thickness of each lens component of the air space between adjacent lens components, n the refractive index of each lens component, and $v$ the Abbe number of each lens component.

4. A wide-angle photographic objective as defined in claim 1, having the following numerical data:

| Total focal length f = 100mm | | Angle of view 2ω = 84° | |
|---|---|---|---|
| Relative aperture 1:2.0 | | | |
| $r_1$ = 379.592 | $d_1$ = 17.14 | $n_1$ = 1.65844 | $v_1$ = 50.8 |
| $r_2$ = 2022.604 | $d_2$ = 0.82 | | |
| $r_3$ = 203.363 | $d_3$ = 17.96 | $n_2$ = 1.71300 | $v_2$ = 53.9 |
| $r_4$ = 60.163 | $d_4$ = 13.67 | | |
| $r_5$ = 123.061 | $d_5$ = 5.31 | $n_3$ = 1.69680 | $v_3$ = 55.6 |
| $r_6$ = 62.286 | $d_6$ = 15.10 | | |
| $r_7$ = 247.755 | $d_7$ = 26.94 | $n_4$ = 1.65844 | $v_4$ = 50.8 |
| $r_8$ = −2564.490 | $d_8$ = 0.41 | | |
| $r_9$ = 157.673 | $d_9$ = 4.49 | $n_5$ = 1.69680 | $v_5$ = 55.6 |
| $r_{10}$ = 93.878 | $d_{10}$ = 8.98 | | |
| $r_{11}$ = 125.616 | $d_{11}$ = 31.43 | $n_6$ = 1.74950 | $v_6$ = 35.0 |
| $r_{12}$ = −934.694 | $d_{12}$ = 10.82 | | |
| $r_{13}$ = −1846.653 | $d_{13}$ = 16.33 | $n_7$ = 1.56384 | $v_7$ = 60.8 |
| $r_{14}$ = −92.653 | $d_{14}$ = 19.18 | | |
| $r_{15}$ = −115.510 | $d_{15}$ = 9.80 | $n_8$ = 1.74443 | $v_8$ = 49.4 |
| $r_{16}$ = −102.041 | $d_{16}$ = 3.27 | $n_9$ = 1.80518 | $v_9$ = 25.5 |
| $r_{17}$ = 225.576 | $d_{17}$ = 5.71 | | |
| $r_{18}$ = −696.873 | $d_{18}$ = 13.88 | $n_{10}$ = 1.74443 | $v_{10}$ = 49.4 |
| $r_{19}$ = −92.347 | $d_{19}$ = 0.41 | | |
| $r_{20}$ = 612.245 | $d_{20}$ = 15.10 | $n_{11}$ = 1.69680 | $v_{11}$ = 55.6 |
| $r_{21}$ = −193.061 | | | | where r represents the curvature radius of each lens surface, d the center thickness of each lens component of the air space between adjacent lens components, n the refractive index of each lens component, and $v$ the Abbe number of each lens component.

* * * * *